(12) United States Patent
Yashiro

(10) Patent No.: US 7,004,149 B2
(45) Date of Patent: Feb. 28, 2006

(54) INTERNAL COMBUSTION ENGINE INTAKE PRESSURE DETECTING DEVICE

(75) Inventor: Yoshinobu Yashiro, Shizuoka-ken (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/507,555

(22) PCT Filed: Mar. 17, 2003

(86) PCT No.: PCT/JP03/03191

§ 371 (c)(1),
(2), (4) Date: Sep. 14, 2004

(87) PCT Pub. No.: WO03/078815

PCT Pub. Date: Sep. 25, 2003

(65) Prior Publication Data

US 2005/0109326 A1    May 26, 2005

(30) Foreign Application Priority Data

Mar. 19, 2002  (JP)  ............................. 2002-077177

(51) Int. Cl.
*F02D 31/04* (2006.01)

(52) U.S. Cl. ................. 123/494; 73/118.1; 123/568.14

(58) Field of Classification Search ............ 123/339.1, 123/342, 351, 399, 403, 478, 480, 486, 491, 123/492, 493, 494, 568.11; 701/101, 102, 701/103, 104, 105, 108; 73/117.3, 118.2, 73/118

See application file for complete search history.

(56) References Cited

U.S. PATENT DOCUMENTS

| 4,466,413 | A | * | 8/1984 | Oonishi et al. ............. 123/493 |
| 5,495,835 | A | * | 3/1996 | Ueda ..................... 123/339.11 |
| 5,722,365 | A | * | 3/1998 | Sadakane et al. ........... 123/491 |
| 6,502,546 | B1 | * | 1/2003 | Kawasaki et al. .......... 123/399 |
| 6,729,301 | B1 | * | 5/2004 | Nakamori et al. .......... 701/108 |
| 2001/0023685 | A1 | * | 9/2001 | Nawa et al. ................ 123/470 |
| 2002/0007822 | A1 | * | 1/2002 | Machida et al. ............ 123/492 |

(Continued)

FOREIGN PATENT DOCUMENTS

JP          01-182555          7/1989

(Continued)

*Primary Examiner*—Willis R. Wolfe, Jr.
(74) *Attorney, Agent, or Firm*—Hogan & Hartson, L.L.P.

(57) ABSTRACT

An internal combustion engine (18) has an intake pipe (34) which extends from an internal combustion engine main body (19) and an intake passageway (33) formed in the interior thereof communicates with an intake passageway (27) formed in the internal combustion engine main body (19), a fuel supply means (36) for supplying fuel to the internal combustion engine main body (19), an intake negative pressure sensor (43) for detecting an intake negative pressure (P) in the intake passageway (33) within the intake pipe (34), and a control unit (44) for controlling the supply of fuel to the internal combustion engine main body (19) by the fuel supply means (36) based on a detection signal of the intake negative pressure sensor (43). The intake negative pressure sensor (43) is adapted to detect an intake negative pressure at a downstream end (42) of the intake passageway (33) within the intake pipe (34). According the intake negative pressure sensor (43), the value of the intake negative pressure (P) in the intake passageway (27) in the internal combustion engine main body (19) is detected accurately.

20 Claims, 4 Drawing Sheets

U.S. PATENT DOCUMENTS

| | | |
|---|---|---|
| 2003/0028295 A1 * | 2/2003 | Wakashiro et al. ............ 701/22 |
| 2003/0051930 A1 * | 3/2003 | Matsubara et al. ......... 180/65.4 |
| 2003/0107335 A1 * | 6/2003 | Kitajima et al. ............... 318/34 |
| 2005/0028790 A1 * | 2/2005 | Ikeda et al. .................. 123/470 |

FOREIGN PATENT DOCUMENTS

| | | |
|---|---|---|
| JP | 03-277935 | 12/1991 |
| JP | 09303144 A * | 11/1997 |
| JP | 10325351 A * | 12/1998 |
| JP | 2002-155778 | 5/2002 |
| JP | 2002-242749 | 8/2002 |
| JP | 2002-317684 | 10/2002 |
| JP | 2002-349375 | 12/2002 |
| JP | 2003-026076 | 1/2003 |

* cited by examiner

INTERNAL COMBUSTION ENGINE INTAKE PRESSURE DETECTING DEVICE

BACKGROUND OF THE INVENTION

1. Technical Field

The present invention relates to an intake negative pressure detecting device for an internal combustion engine which is designed to detect intake negative pressure inside an intake passageway within an intake pipe.

2. Background Art

There exists conventional intake negative pressure detecting devices for internal combustion engines.

A coventional internal combustion engine includes an intake pipe which extends from an internal combustion engine main body having a cylinder and a piston and in which an intake passageway formed in the interior thereof communicates with an intake passageway formed in the internal combustion engine main body. A fuel supply unit supplies fuel to the internal combustion engine main body. An intake negative pressure sensor for detecting the intake negative pressure in the intake passageway within the intake pipe and a control unit for controlling the supply of fuel to the internal combustion engine by the fuel supply unit based on a detection signal of the intake negative pressure sensor are also provided.

When the internal combustion engine is in operation, the intake negative pressure in the intake passageway is detected by the intake negative pressure sensor, and a detection signal of the sensor is then inputted into the control unit. Then, the fuel supply unit is controlled by the control unit, so that an amount of fuel that matches the intake negative pressure so detected is supplied to the internal combustion engine main body by the fuel supply unit.

According to the control of the fuel supply unit by the control unit, the fuel consumption of the internal combustion engine is improved, and inclusion of harmful substances contained in exhaust emissions is suppressed.

Incidentally, a detecting position of the intake negative pressure by the intake negative pressure sensor is situated upstream from the fuel supply unit and is far apart from the internal combustion engine main body.

Due to this, an error tends to be easily produced between a detected value of the intake negative pressure by the intake negative pressure sensor and a value of the intake negative pressure in the intake passageway in the internal combustion engine main body that results when the detection is carried out by the intake negative pressure sensor. As a result, there is caused a risk that an amount of fuel that matches the intake negative pressure in the intake passageway in the internal combustion engine main body is not supplied. Namely, there still remain areas needing to be improved with respect to the improvement in fuel consumption of the internal combustion engine and the prevention of emission of harmful substances.

SUMMARY OF THE INVENTION

The invention was made in view of the above situations, and an advantage thereof is to realize a more accurate detection of an intake negative pressure value in an intake passageway in an internal combustion engine main body so as to improve the fuel consumption of an internal combustion engine and to reduce harmful substances contained in exhaust emissions through a control based on the value thus detected.

In addition, another advantage of the invention is to attain the above advantage with a simple construction.

According to an aspect of the invention, there is provided an intake negative pressure detecting device for an internal combustion engine including an intake pipe which extends from an internal combustion engine main body and an intake passageway formed in the interior thereof communicates with an intake passageway formed in the internal combustion engine main body. A fuel supply unit supplies fuel to the internal combustion engine main body, an intake negative pressure sensor detects an intake negative pressure in the intake passageway within the intake pipe, and a control unit controls the supply of fuel to the internal combustion engine main body by the fuel supply unit based on a detection signal of the intake negative pressure sensor. The intake negative pressure detecting device provides that the intake negative pressure sensor is adapted to detect an intake negative pressure at a downstream end of the intake passageway within the intake pipe.

According to the aspect of the invention, since an intake negative pressure at the downstream end of the intake pipe which is situated in the vicinity of the intake passageway in the internal combustion engine man body is detected by the intake negative pressure sensor, the intake negative pressure sensor can detect more accurately the intake negative pressure value in the intake passageway in the internal combustion engine main body.

Consequently, the fuel supply unit is controlled by the control unit based on the detection signal of the intake negative pressure sensor such that an appropriate amount of fuel is supplied to the internal combustion engine main body by the fuel supply unit, and therefore, the fuel consumption of the internal combustion engine is improved, and harmful substances contained in exhaust emissions are reduced.

In addition, the intake negative pressure sensor is mounted directly on an exterior side of the intake pipe and a communication passageway is formed in the intake pipe for causing the intake passageway in the intake pipe to communicate with the intake negative pressure sensor.

Incidentally, the cross-sectional area of a downstream side communication passageway which constitutes a portion of the communication passageway which is situated on the intake negative pressure sensor side may be made larger than the cross-sectional area of an upstream side communication passageway which constitutes a portion of the communication passageway which is situated on the intake passageway side. The intake negative pressure sensor may include a housing which constitutes an outer shell thereof and which is mounted on an exterior side of the intake pipe and a sensor main body accommodated in the interior of the housing for detecting an intake negative pressure, and a pressure transmitting passageway is formed in the housing for transmitting an intake negative pressure from the downstream side communication passageway to the sensor main body side. An opening of the pressure transmitting passageway which opens to the interior of the downstream side communication passageway may be deviated from the center of an opening of the upstream side communication passageway which opens to the interior of the downstream side communication passageway in a direction normal to the center of the opening.

In addition, the intake pipe may be formed so as to be curved into an arc-like shape substantially about an imaginary point, and an opening of the communication passageway which is situated at an end portion on the intake passageway side thereof may be positioned in a portion on an inner circumferential surface of the intake pipe which is closer to the imaginary point at the downstream end of the intake passageway.

According to another aspect of the invention, ther is provided an intake negative preessure detecting device for an internal combustion enginge comprising an intake passageway communicating with a combustion chamber (25), a fuel supply means (36) for supplying fuel to the combustion chamber (25), an intake negative pressure sensor (43) for detecting an intake negative pressure (P) in the intake passageway through a communication passageway (47), and a control unit (44) for controlling the supply of fuel by the fuel supply means (36) based on a detection signal of the intake negative pressure sensor (43), the intake negative pressure detecting device for an internal combustion engine being characterized in that the intake passageway is extended upwardly from the combustion chamber (25), the intake passageway is curvedly formed so as to be curved as it extends upwardly into an arc-like shape substantially about an imaginary point (65), one end portion of the communication passageway (47) is opened to a curved portion of the intake passageway, the communication passageway (47) is extended upwardly from the one end portion, and another end portion of the communication passageway (47) is opened to the intake negative pressure sensor (43) side.

DETAILED DESCRIPTION OF THE INVENTION

Figure 1:
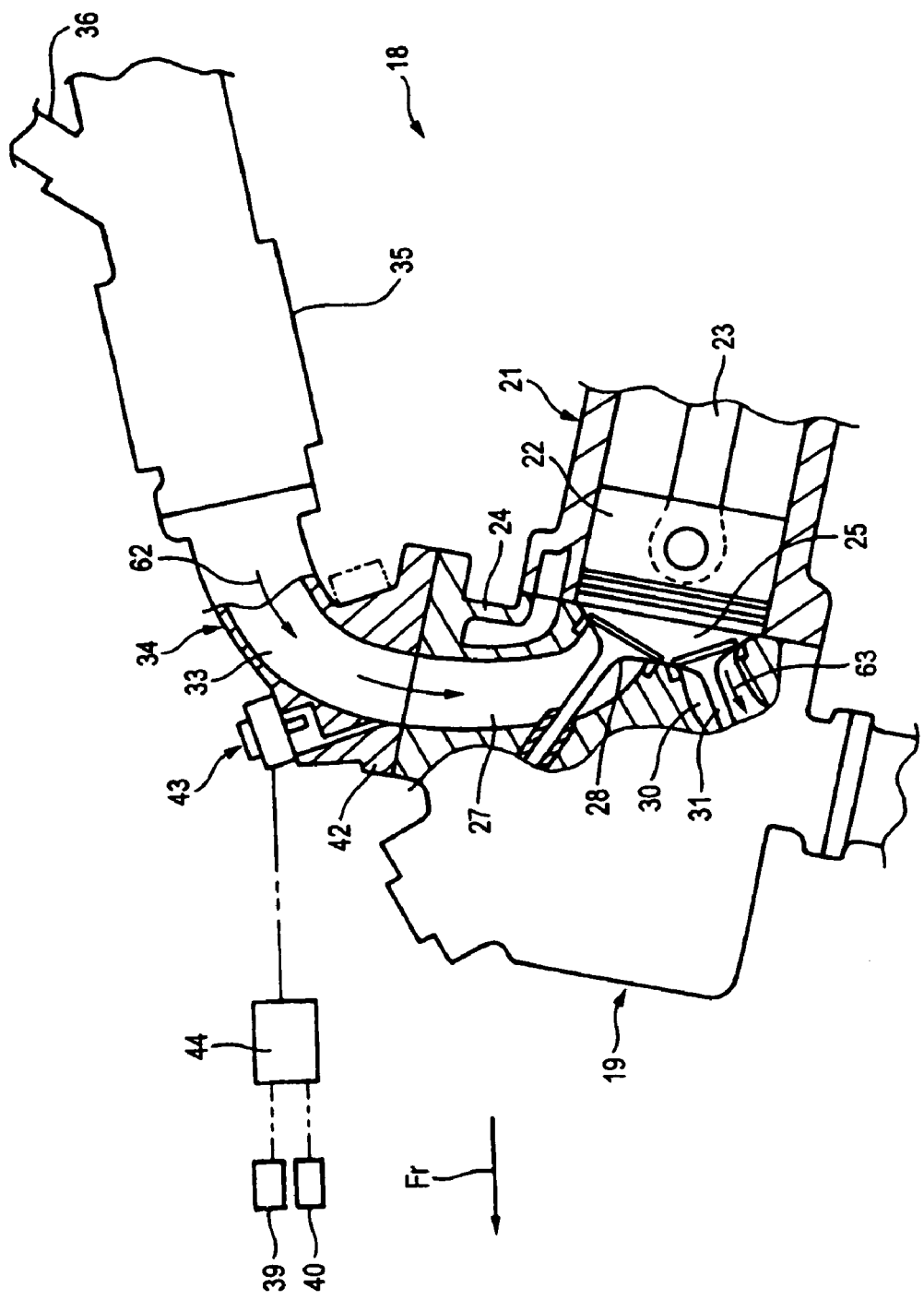
FIG. 1 is a partially enlarged cross-sectional view of FIG. 2.
Figure 2:
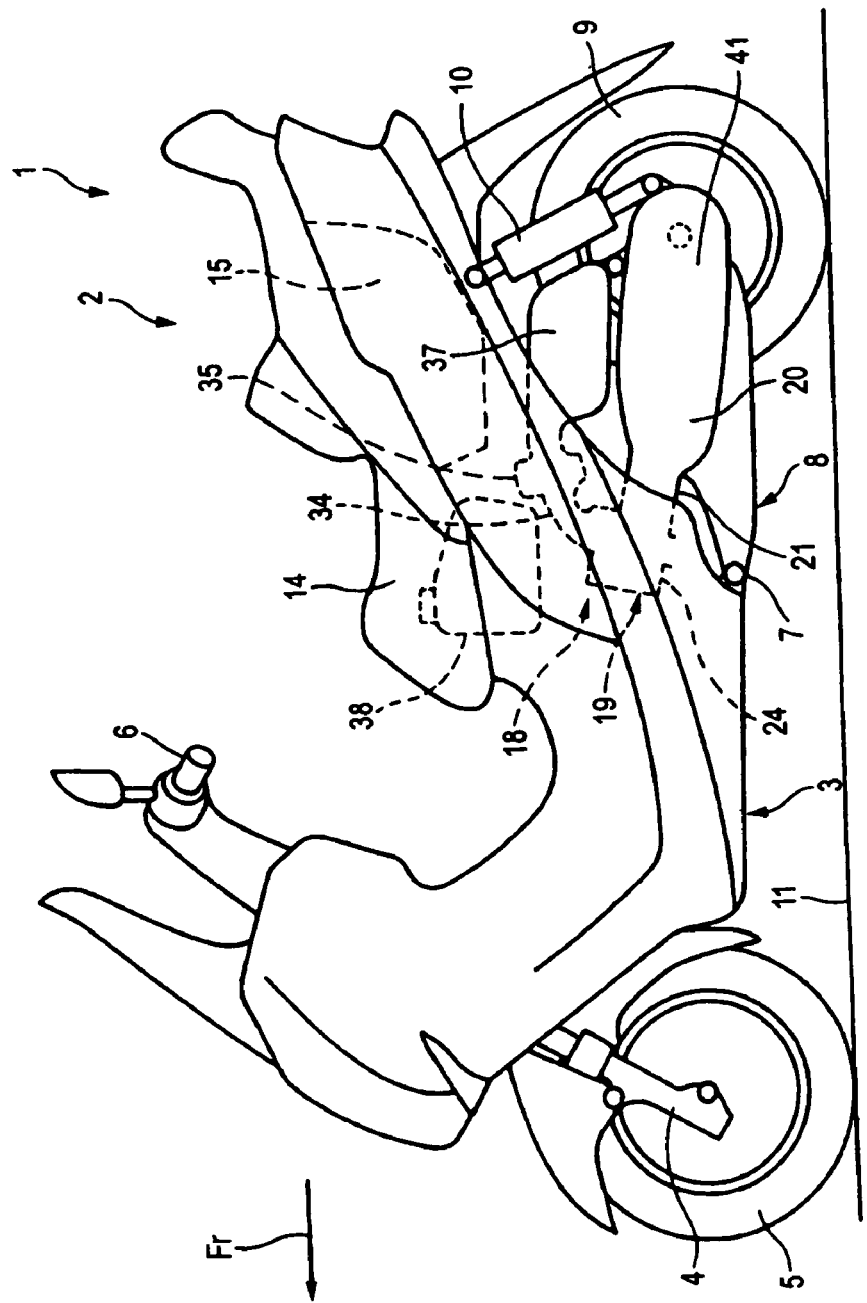
FIG. 2 is an overall side view of a vehicle.

The invention will be described in more detail with reference to the accompanying drawings.

In the drawings, reference numeral 1 denotes a vehicle illustrated in the form of a straddle type motorcycle, and an arrow Fr indicates a forward direction of the vehicle 1.

A vehicle body 2 of the vehicle 1 includes a vehicle main body 3 which is mainly made up of a vehicle body frame, a front fork 4 supported at a front end portion of the vehicle main body 3 in such a manner as to be steered freely, a front wheel 5 rotationally supported at a lower end portion of the front fork 4, and a handlebar 6 supported at an upper end portion of the front fork 4. The vehicle body 2 also includes a rear arm 8 disposed to the rear of a lower portion of the vehicle main body 3 so as to extend longitudinally and pivotally supported at a front end portion thereof by a pivot shaft 7 at a rear lower portion of the vehicle main body 3 so that a rear portion of the rear arm 8 is allowed to swing vertically. A rear wheel 9 is rotationally supported at a rear end portion of the rear arm 8 and a shock absorber 10 for allowing the rear portion of the rear arm 8 to be resiliently supported on a rear upper portion of the vehicle main body 3. The vehicle body 2 is supported on a road surface 11 by the front and rear wheels.

The vehicle 1 includes a seat 14 supported on an upper surface of the rear upper portion of the vehicle main body 3 and an article installation space 15 for installing a small article such as a helmet which is situated above the rear wheel 9 and below the seat 14 and formed in the interior of the rear upper portion of the vehicle main body 3 in such a manner as to open upwardly. The seat 14 opens and closes the upper surface of the rear upper portion of the vehicle main body 3, and the article installation space 15 is allowed to open upwardly when the seat 14 is so operated, whereby a small article such as a helmet can be taken out of or placed in the article installation space 15.

The vehicle 1 includes a four-cycle internal combustion engine 18 which is mounted on the vehicle main body 3 and which constitutes a driving source for the vehicle 1 when running. The internal combustion engine 18 has an internal combustion engine main body 19 which constitutes a front portion of the rear arm 8. The internal combustion engine main body 19 includes a crankcase 20 which is pivotally supported on the vehicle main body 3 by the pivot shaft 7, a cylinder 21 which protrudes forward from the crankcase 20, a piston 22 which is fitted in the cylinder 21, and a connecting rod 23 for allowing a crankshaft rotationally supported on the crankcase 20 to interlock with and connect to the piston 22. A space in the cylinder 21 which is defined by a cylinder head 24 which constitutes a protruding end portion of the cylinder 21 and the piston 22 is made to constitute a combustion chamber 25.

An intake passageway 27 is formed in the cylinder head 24 of the cylinder 21 which extends from a top portion of the cylinder head 24 to communicate with the combustion chamber 25. This intake passageway 27 extends downwardly from an upper end opening thereof to open to the combustion chamber 25, and an intake valve 28 is supported on the cylinder head 24 in such a manner as to open and close the opening of the intake passageway 27 directed toward the combustion chamber 25. In addition, an exhaust passageway 30 is formed in the cylinder head 24 which provides a communication from the combustion chamber 25 to below the cylinder head, and an exhaust valve 31 is supported on the cylinder head 24 in such a manner as to open and close the exhaust passageway 30. The intake valve 28 and the exhaust valve 30 are made to interlock with and connect to the crankshaft via a valve train, not shown, so as to be operated to perform appropriate opening and closing actions.

The internal combustion engine 18 includes an intake pipe 34 which extends upwardly from an upper surface side of the internal combustion engine main body 19 and in which an intake passageway 33 formed in the interior thereof communicates with the intake passageway 27 formed in the cylinder head 24 of the internal combustion engine main body 19. A throttle valve 35 is interposed at an intermediate position along the length of the intake pipe 34 and adapted to adjust the opening of the intake passageway 33 in the intake pipe 34. A fuel supply unit 36 which may be a fuel injection valve, for supplying fuel at a position upstream of the throttle valve 35 to the combustion chamber 25 in the internal combustion chamber main body 19 via the intake passageway 33 in the intake pipe 34. An air cleaner 37 is mounted on an extending end portion of the intake pipe 34. A fuel tank 38 for storing fuel that is to be supplied to the fuel supply unit 36 is disposed near the fuel supply unit 36 in front thereof, and the fuel tank 38 is supported on the vehicle main body 3.

The rear arm 8 is made to be a swinging driving unit. Namely, the rear arm 8 includes the internal combustion chamber main body 19 which constitutes a front part of the rear arm 8 and a power transmission 41 which is provided in such a manner as to continue to a rear part of the internal combustion engine main body 19 and which rotationally supports the rear wheel 9 to make the rear wheel 9 interlock with and connect to the internal combustion engine main body 19.

The internal combustion engine includes a crank angle sensor 39 for detecting a crank angle θ of the crankshaft in the internal combustion engine main body 19, a throttle position sensor 40 for detecting the opening of the intake passageway in the throttle valve 35 (throttle opening), an intake negative pressure sensor 43 for detecting an intake negative pressure P at a downstream end 42 of the intake passageway 33 in the intake pipe 34 and a control unit 44 for electronically controlling the amount of fuel injected by the fuel supply unit 36 for supply to the combustion chamber 25 in the internal combustion engine main body 19 based on detection signals from the respective sensors 39, 40, 43.

The intake negative pressure sensor 43 is detachably fastened to an exterior side of a downstream end portion of the intake pipe 34 which corresponds to the downstream end 42 of the intake passageway 33 in the intake pipe 34 with a fastener 46, whereby the intake negative pressure sensor 43 is mounted directly on the exterior side of the intake pipe 34. A communication passageway 47 is formed in the downstream end portion of the intake pipe 34 for providing a communication between the downstream end 42 of the intake passageway 33 in the intake pipe 34 and the intake negative pressure sensor 43.

In the communication passageway 47, the cross-sectional area S2 of a downstream side communication passageway 49 which constitutes a portion of the communication passageway which is situated on the intake negative pressure sensor 43 side is made larger than the cross-sectional area S1 of an upstream side communication passageway 48 which constitutes a portion of the communication passageway which is situated on the intake passageway side. That is, the volume of the downstream side communication passageway is made to be a large volume air chamber. The upstream side communication passageway 48 extends linearly from the downstream end 42 side of the intake passageway 33 toward the downstream side communication passageway 49 side and is formed into a shape whose horizontal cross section remains the same sized circle along substantially the full length thereof.

The intake negative pressure sensor 43 includes a housing 51 which constitutes an outer shell of the intake negative pressure sensor 43 and which is mounted directly on an exterior side of the intake pipe 34 via a packing or the like, and a sensor main body 52 which is a sensor such as a strain sensor accommodated in the interior of the housing 51 for detecting an intake negative pressure P at the downstream end 42 of the intake passageway 33.

The housing 51 includes a housing main body 53 for accommodating the sensor main body 52 in the interior thereof and a pressure transmitting pipe 54 extending linearly from the housing main body 53 toward the interior of the downstream side communication passageway 49. A pressure transmitting passageway 55 is formed in the interior of the pressure transmitting pipe 54 in such a manner as to provide a communication from the downstream side communication passageway 49 toward the sensor main body 52 side for transmitting an intake negative pressure P from the downstream side communication passageway 49 to the sensor main body 52. The pressure transmitting passageway 55 is formed into a shape whose horizontal cross section remains the same seized circle along substantially the full length thereof.

An opening 59 of the pressure transmitting passageway 55 which is made to face the interior of the downstream side communication passageway 49 is deviated relative to a center 58 of an opening 57 of the upstream side communication passageway 48 which is made to face the interior of the downstream side communication passageway 49 in a direction normal to the center 58.

When the internal combustion engine 18 is in operation, in association with the operation of the internal combustion engine main body 19, atmospheric side air 62 is sucked into the combustion chamber 25 after having passed sequentially through the air cleaner 37, the fuel supply unit 36 and the respective intake passageways 27, 33 in that order. As this occurs, fuel is supplied into the intake passageway 33 by the fuel supply unit 36 so as to produce an air-fuel mixture. The air-fuel mixture so produced is then caused to flow into the combustion chamber 25 for use in combustion, whereby a driving force is outputted from the internal combustion engine main body 19 of the internal combustion engine 18. Combustion gases produced as a result of such combustion pass through the exhaust passageway 30 and is then discharged to the outside of the internal combustion engine 18 as exhaust emissions. Then, the driving force so outputted is transmitted to the rear wheel 9 via the power transmission 41, whereby the vehicle 1 is allowed to run on the road surface 11.

Figure 4:
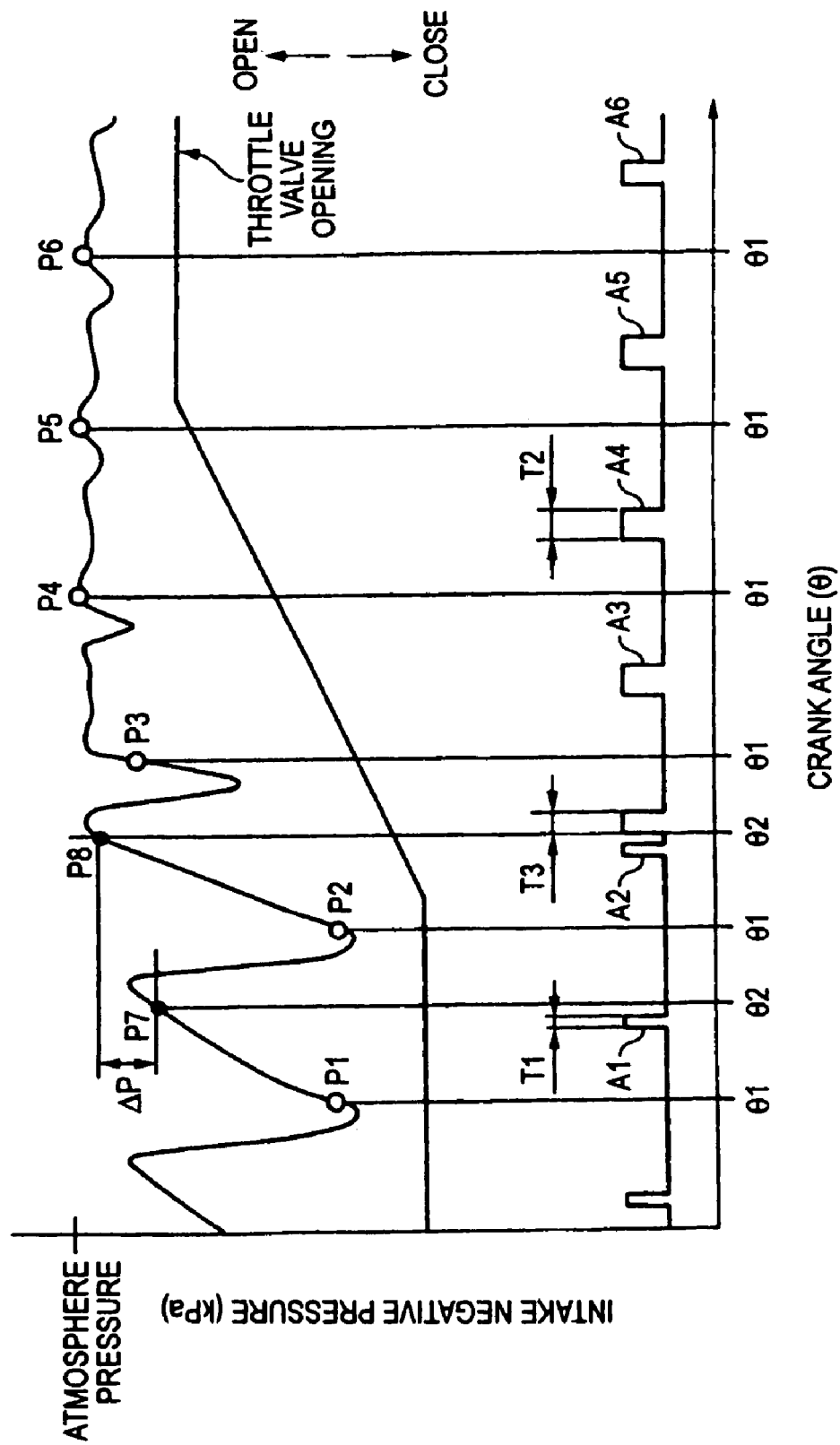
FIG. 4 is a graph showing operating conditions of an internal combustion engine.

In FIG. 4, the fuel injection timing (crank angle θ) and time period T of injection A, that is, the injection amount of the fuel supply unit 36 is designed to be determined based on detection signals of the respective sensors 39, 40, 43 by the fuel supply unit 36.

Namely, the timing of injection A by the fuel supply unit 36 is determined to take place at predetermined crank angles θ which are substantially identical to each other at transition timings from a compression stroke to a suction stroke of the internal combustion engine 18, whereby each injection A is implemented, and the time period T of injection A is controlled as below. Namely, the time period T of injection A of fuel is determined in accordance with the magnitude of an intake negative pressure P detected by the intake negative pressure sensor 43 at predetermined crank angles θ1 which are substantially identical to each other at transition timings from a compression stroke to a power stroke (which are regarded as identical to each other). Note that in FIG. 4, P1 to P6 and A1 to A6 correspond to each other, respectively.

To be more specific, that the intake negative pressure P is large like P1, P2 (or small like P3 to P6) means that the throttle position sensor 40 detects the throttle opening as being closed (or open), requiring the output of less (or more) driving force. Due to this, the time period T of injection A of fuel is made to be shorter like a time period T1 for injections A1, A2 (or made to be longer like a time period of T2 for injections A3 to A6).

In addition, whether or not the internal combustion engine 18 is operated for acceleration is determined as below.

Namely, an intake negative pressure P is detected by the intake negative pressure sensor 43 in the aforesaid manner at predetermined crank angles θ2 which are substantially identical to each other at transition timings from an exhaust stroke to a suction stroke (which are regarded as identical to each other), and it is designed such that when a difference ΔP=P8−P7 between intake negative pressures P7, P8 which are adjacent to each other in terms of a time exceeding a predetermined set value, the internal combustion engine 18 is determined as being operated for acceleration. Then, the time period T of injection A is set based on the determination.

The fuel consumption of the internal combustion engine 18 is improved and the containment of harmful substances in constituents of exhaust emissions 63 is suppressed by controlling the fuel supply unit 36 by the control unit 44.

According to the construction that has been described heretofore, the intake negative pressure sensor 43 is designed to detect an intake negative pressure P at the downstream end 42 of the intake passageway 33 in the intake pipe 34.

Due to this, since the intake negative pressure P at the downstream end 42 of the intake pipe 34 which is located in the vicinity of the intake passageway 27 in the internal combustion engine main body 19 is detected by the intake negative pressure sensor 43, according to this intake negative pressure sensor 43, the value of an intake negative pressure P in the intake passageway 27 in the internal combustion engine main body 19 can be detected more accurately.

Consequently, according to the detection signal of the intake negative pressure sensor 43, the fuel supply unit 36 is controlled by the control unit 44 such that the fuel supply unit 36 supplies an appropriate amount of fuel to the internal combustion engine main body 19, and owing to this, the fuel consumption of the internal combustion engine 18 is improved, and harmful substances in the exhaust emissions 63 are reduced.

In addition, as has been described above, the intake negative pressure sensor 43 is designed to detect the intake negative pressure P at the predetermined crank angles θ1.

Due to this, in case a crank angle θ at which the intake negative pressure P at the downstream end 42 of the intake passageway 33 in the intake pipe 34 becomes a relatively large value is set as the predetermined crank angle θ1, errors between values detected by the intake negative pressure sensor 43 can be reduced to a lower level.

Consequently, according to the detection signal from the intake negative pressure sensor 43, the fuel consumption of the internal combustion engine 18 is improved, and the harmful substances in the exhaust emissions 63 are reduced.

Additionally, the intake negative pressure sensor 43 is mounted directly on the exterior side of the intake pipe 34, and the communication passageway 47 is formed in the intake pipe 34 for providing a communication between the intake passageway 33 in the intake pipe 34 and the intake negative pressure sensor 43.

Due to this, since the intake negative pressure P in the intake pipe 34 at the intake passageway 33 is detected by the intake negative pressure sensor 43 more directly, the value of the intake negative pressure P in the intake passageway 27 in the internal combustion engine main body 19 can be detected more accurately by the intake negative pressure sensor 43.

Consequently, the fuel supply unit 36 is controlled accordingly to supply a more appropriate amount of fuel to the internal combustion engine main body 19, whereby the fuel consumption of the internal combustion engine 18 is improved further and the harmful substances in the exhaust emissions 63 are reduced further.

In addition, as has been described above, since the intake negative pressure sensor 43 is mounted directly on the exterior side of the intake pipe 34, the number of parts involved in the internal combustion engine 18 is reduced when compared with a case where the intake pipe 34 and the sensor 43 are connected to each other via a tube, whereby the improvement in fuel consumption and the like can be attained with a simple construction.

Additionally, as has been described before, in the internal combustion engine 18, the cross-sectional area S2 of a downstream side communication passageway 49 which constitutes a portion of the communication passageway 47 which is situated on the intake negative pressure sensor 43 side is made larger than the cross-sectional area S1 of an upstream side communication passageway 48 which constitutes a portion of the communication passageway 47 which is situated on the intake passageway side. The intake negative pressure sensor 43 includes the housing 51 which is mounted directly on the exterior side of the intake pipe 34 and the sensor main body 52 which is accommodated in the interior of the housing 51 for detecting the intake negative pressure P. The housing 51 includes the pressure transmitting passageway 55 for transmitting the intake negative pressure P from the downstream side communication passageway 49 to the sensor main body 52 side. The opening 59 of the pressure transmitting passageway 55 which is made to face the interior of the downstream side communication passageway 49 is deviated relative to the center 58 of the opening 57 of the upstream side communication passageway 48 which is made to face the interior of the downstream side communication passageway 49 in the direction normal to the center 58.

Due to this, even in the event that some fuel which passes through the intake passageway 33 in the intake pipe 34 attempts to pass from the intake passageway 33 through the upstream side communication passageway 48 and the downstream side communication passageway 49 sequentially to be scattered toward the opening 59 of the pressure transmitting passageway 55 of the intake negative pressure sensor 43, the fuel is restrained from moving from the opening 57 of the upstream side communication passageway 48 directly to the opening 59 of the pressure transmitting passageway 55. Thus, the adhesion of fuel to the sensor main body 52 through the pressure transmitting passageway 55 of the intake negative pressure sensor 43 is prevented accordingly.

Thus, according to the intake negative pressure sensor 43, the value of the intake negative pressure P in the intake passageway 27 can be detected more accurately without being interfered with by the fuel, so that improvement of the fuel consumption of the internal combustion engine 18 can be surely achieved. Also, since the adhesion of fuel to the sensor main body 52 of the intake negative pressure sensor 43 is prevented, the life duration of the intake negative pressure sensor 43 is improved.

Figure 3:
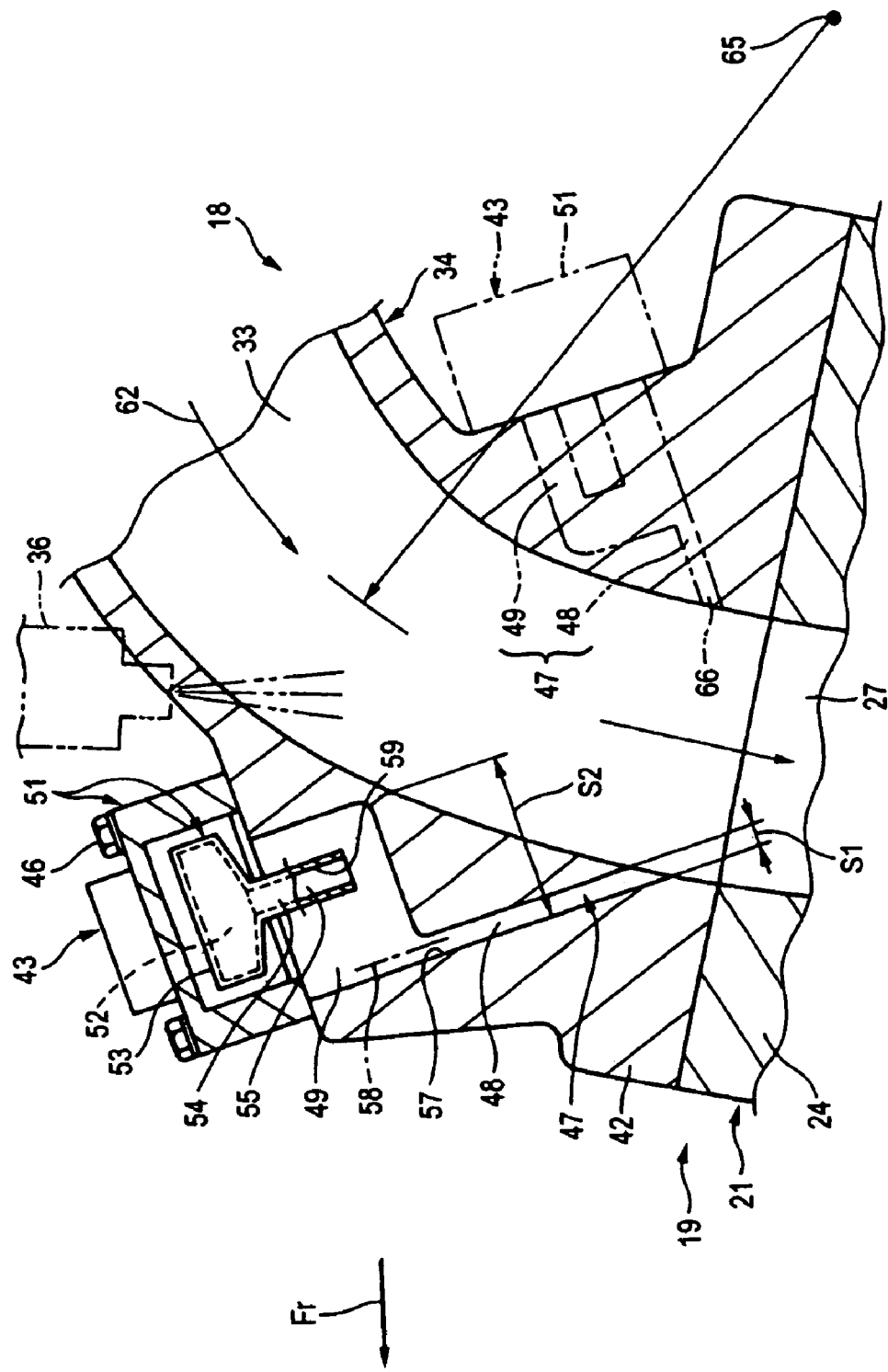
FIG. 3 is a partially enlarged cross-sectional view of FIG. 1.

In FIGS. 1 and 3, as shown by double-dashed lines, the intake pipe 34 is formed to be curved into an arc-like shape toward the rear substantially about the imaginary point 65 situated on the rear of the downstream end of the intake pipe 34. Then, an opening 66 of the communication passageway 47 situated at an intake passageway 33 side end portion thereof is positioned at a portion on the inner circumferential surface of the intake passageway 33 which is closer to the imaginary point 65 at the downstream end 42 of the intake passageway 33 in the intake pipe 33.

Here, in the event that the intake pipe 34 is curved as described above, fuel flowing through the intake passageway 33 in the intake pipe 34 toward the internal combustion engine main body 19 flows along a portion on the inner circumferential surface of the intake passageway 33 which is farther apart from the imaginary point 65 by virtue of the inertia force thereof.

Due to this, as has been described above, in the event that the opening 66 of the communication passageway 47 situated at the intake passageway 33 side end portion thereof is positioned at the portion which is closer to the imaginary point 65 at the downstream end 42 of the intake passageway 33 in the intake pipe 33, the easy entry of some of the fuel flowing through the intake passageway 33 in the intake pipe 34 into the communication passageway 47 is restrained, and the adhesion of fuel which flows in through the pressure transmitting passageway 55 of the intake negative pressure sensor 43 is prevented accordingly.

Consequently, according to the intake negative pressure sensor 43, the intake negative pressure P value in the intake passageway of the internal combustion engine main body 19 is detected more accurately without being interrupted by fuel, whereby the improvement in fuel consumption of the internal combustion engine 18 and the like can be attained more accurately. In addition, the life of the intake negative pressure sensor 43 is extended as the adhesion of fuel to the sensor main body 52 of the intake negative pressure sensor 43 is restrained.

In this case, the opening 66 of the communication passageway 47 facing the downstream end 42 of the intake passageway 33 in the intake pipe 34 may be positioned at, among locations along the inner circumference of the intake passageway 33 at the downstream end 43 thereof, any location along a semi-circumference of the intake passageway 33 which are closer to the imaginary point 65.

In FIG. 3, as shown by the double-dashed lines, the fuel supply unit 36 may be such as to inject fuel into the intake passageway 33 at a position downstream of the throttle valve 35.

Note that while the description has been made by reference to the example illustrated in the drawings, the internal combustion engine 18 is not limited to such as one to be installed in the vehicle 1, and in addition, the internal combustion engine 18 may be a 2-cycle one. Additionally, the fuel supply unit 36 may be a fuel injection valve which injects fuel directly into the cylinder 21 in the internal combustion engine main body 19 or a carburetor.

In addition, the invention may be such as to be attained by combining appropriately the aforesaid individual constituent members.

What is claimed is:

1. An intake negative pressure detecting device for an internal combustion engine, comprising:
   an intake passageway extended upwardly from the combustion chamber, the intake passageway being curvedly formed so as to be curved as it extends upwardly into an arc-like shape substantially about an imaginary point; and
   one end portion of a communication passageway being opened to a curved portion of the intake passageway, the communication passageway being extended upwardly from the one end portion, and another end portion of the communication passageway being opened to the intake negative pressure sensor side.

2. The intake negative pressure detecting device for an internal combustion engine as set forth in claim 1, wherein the intake pipe extends from an internal combustion engine main body.

3. The intake negative pressure detecting device for an internal combustion engine as set forth in claim 2, wherein the intake passageway is formed in the interior of the intake pipe and communicates with the intake passageway of the internal combustion engine main body.

4. The intake negative pressure detecting device for an internal combustion engine as set forth in claim 2, further comprising a fuel supply means for supplying fuel to the internal combustion engine main body and a control unit that controls the supply of fuel to the internal combustion engine main body by the fuel supply means based on a detection signal of the intake pressure sensor.

5. An intake negative pressure detecting device for an internal combustion engine, comprising:
   an intake negative pressure sensor adapted to detect an intake negative pressure at a downstream end of the intake passageway within the intake pipe; and
   an intake pipe formed so as to be curved into an arc-like shape substantially about an imaginary point, and an opening of the communication passageway which is situated at an end portion on the intake passageway side is positioned in a portion on an inner circumferential surface of the intake passageway which is closer to the imaginary point at the downstream end of the intake passageway.

6. The intake negative pressure detecting device for an internal combustion engine as set forth in claim 5, wherein the intake pipe extends from an internal combustion engine main body.

7. The intake negative pressure detecting device for an internal combustion engine as set forth in claim 6, wherein the intake passageway is formed in the interior of the intake pipe and communicates with the intake passageway of the internal combustion engine main body.

8. The intake negative pressure detecting device for an internal combustion engine as set forth in claim 6, further comprising a fuel supply means for supplying fuel to the internal combustion engine main body.

9. The intake negative pressure detecting device for an internal combustion engine as set forth in claim 8, further comprising a control unit that controls the supply of fuel to the internal combustion engine main body by the fuel supply means based on a detection signal of the intake pressure sensor.

10. An intake negative pressure detecting device for an internal combustion engine, comprising:
    an intake negative pressure sensor adapted to detect an intake negative pressure at a downstream end of an intake passageway within an intake pipe wherein the intake negative pressure sensor is mounted directly on an exterior side of the intake pipe; and
    a communication passageway formed in the intake pipe for causing the intake passageway in the intake pipe to communicate with the intake negative pressure sensor.

11. The intake negative pressure detecting device for an internal combustion engine as set forth in claim 3, wherein the intake pipe is formed so as to be curved into an arc-like shape substantially about an imaginary point, and an opening of the communication passageway which is situated at an end portion on the intake passageway side is positioned in a portion on an inner circumferential surface of the intake passageway which is closer to the imaginary point at the downstream end of the intake passageway.

12. The intake negative pressure detecting device for an internal combustion engine as set forth in claim 10, wherein the intake pipe extends from an internal combustion engine main body.

13. The intake negative pressure detecting device for an internal combustion engine as set forth in claim 12, wherein the intake passageway is formed in the interior of the intake pipe and communicates with the intake passageway of the internal combustion engine main body.

14. The intake negative pressure detecting device for an internal combustion engine as set forth in claim 12, further comprising a fuel supply means for supplying fuel to the internal combustion engine main body.

15. The intake negative pressure detecting device for an internal combustion engine as set forth in claim 14, further comprising and a control unit that controls the supply of fuel to the internal combustion engine main body by the fuel supply means based on a detection signal of the intake pressure sensor.

16. The intake negative pressure detecting device for an internal combustion engine as set forth in claim 1, wherein a cross-sectional area of a downstream side communication passageway which constitutes a portion of the communication passageway which is situated on the intake negative pressure sensor side thereof is made larger than a cross-sectional area (S1) of an upstream side communication passageway which constitutes a portion of the communication passageway which is situated on an intake passageway side thereof.

17. The intake negative pressure detecting device for an internal combustion engine as set forth in claim 16, wherein the intake negative pressure sensor includes a housing which constitutes an outer shell thereof and which is mounted on an exterior side of the intake pipe.

18. The intake negative pressure detecting device for an internal combustion engine as set forth in claim 17, wherein the intake negative pressure sensor includes a sensor main body accommodated in an interior of the housing that detects an intake negative pressure.

19. The intake negative pressure detecting device for an internal combustion engine as set forth in claim 18, wherein the intake negative pressure sensor includes a pressure transmitting passageway formed in the housing that transmits the intake negative pressure from the downstream side communication passageway to the sensor main body side.

20. The intake negative pressure detecting device for an internal combustion engine as set forth in claim 19, further comprising an opening of the pressure transmitting passageway which opens to an interior of the downstream side communication passageway deviated from a center of an opening of the upstream side communication passageway which opens to the interior of the downstream side communication passageway in a direction normal to the center.

* * * * *